United States Patent
Edmonson

(10) Patent No.: US 10,773,762 B1
(45) Date of Patent: *Sep. 15, 2020

(54) FORWARD FACING VEHICLE TRANSPORT APPARATUS

(71) Applicant: Ironman FFB, LLC, Edmond, OK (US)

(72) Inventor: Tommy Edmonson, Choctaw, OK (US)

(73) Assignee: Ironman FFB, LLC, Edmond, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,020

(22) Filed: Dec. 28, 2018

(51) Int. Cl.
*B62D 63/06* (2006.01)

(52) U.S. Cl.
CPC .................... *B62D 63/065* (2013.01)

(58) Field of Classification Search
CPC ..... B62D 63/065; B62D 53/062; B60P 3/077; B60P 3/125
See application file for complete search history.

(56) References Cited

U.S. PATENT DOCUMENTS

| | | | |
|---|---|---|---|
| 3,837,673 A | 9/1974 | McCarthy | |
| 3,881,749 A * | 5/1975 | Berends | B62D 53/065 280/417.1 |
| 3,987,919 A | 10/1976 | Weeks et al. | |
| 4,132,326 A | 1/1979 | Pinto | |
| 4,317,579 A | 3/1982 | Louw | |
| 4,348,054 A | 9/1982 | Shonkwiler et al. | |
| 4,372,572 A * | 2/1983 | Verschage | B62D 53/065 280/441.2 |
| 4,493,491 A | 1/1985 | Karlik | |
| 4,569,531 A | 2/1986 | Beadle | |
| 4,632,629 A * | 12/1986 | Kooima | B60P 3/125 280/402 |
| 4,650,205 A | 3/1987 | Jarlsson | |
| 4,737,066 A * | 4/1988 | Allison, Jr. | B60P 3/125 280/402 |
| 4,778,333 A * | 10/1988 | Youmans | B60P 3/125 280/402 |
| 4,842,472 A * | 6/1989 | Plant | B60P 3/125 280/402 |
| 4,943,202 A | 7/1990 | Galloway | |

(Continued)

*Primary Examiner* — Anne Marie M Boehler
*Assistant Examiner* — Michael R Stabley
(74) *Attorney, Agent, or Firm* — Hall Estill Attorneys at Law; Tyler Mantooth

(57) ABSTRACT

A forward facing vehicle transport apparatus ("FFVTA") is provided. The FFVTA includes at least a main support member supported by an axle, and the axle in turn is supported by a wheel. The FFVTA further provides a toe tongue that is secured to the main support member and extends in a first direction from the main support. The toe tongue provides a telescopic extension member communicating with an extension mechanism, the telescopic extension member is configured to interact with a steer axle of a first vehicle, the steer axle supported by a tire of the first vehicle. The FFVTA further includes a pull tongue secured to the main support member and extending in a second direction from then main support. The pull tongue provides a sliding extension member that communicates with an expansion mechanism. The sliding extension member is configured to interact with a fifth wheel of a second vehicle.

17 Claims, 8 Drawing Sheets

(56) References Cited

U.S. PATENT DOCUMENTS

| | | | | |
|---|---|---|---|---|
| 5,013,056 A | | 5/1991 | Landoll et al. | |
| 5,016,897 A | * | 5/1991 | Kauffman | B60P 3/073 |
| | | | | 280/402 |
| 5,249,911 A | * | 10/1993 | Marola | B62D 53/0828 |
| | | | | 280/402 |
| 5,326,215 A | * | 7/1994 | Eberhardt | B60P 3/07 |
| | | | | 410/29.1 |
| 5,566,964 A | * | 10/1996 | Leonard | B60D 1/07 |
| | | | | 280/416.1 |
| 5,667,231 A | | 9/1997 | Dierks et al. | |
| 5,863,059 A | | 1/1999 | Waggoner | |
| 6,036,207 A | | 3/2000 | Oehlerking et al. | |
| 6,036,428 A | * | 3/2000 | Kooima | B60P 3/125 |
| | | | | 280/402 |
| 6,287,061 B1 | | 9/2001 | Tinnell | |
| 6,786,158 B2 | | 9/2004 | Jacob | |
| 6,857,376 B2 | | 2/2005 | Coslovi et al. | |
| 6,886,362 B2 | | 5/2005 | Wilding et al. | |
| 6,893,205 B2 | | 5/2005 | Heim et al. | |
| 6,901,728 B2 | | 6/2005 | Keiderman | |
| 6,902,368 B2 | | 6/2005 | Hagenzieker | |
| 7,017,934 B2 | * | 3/2006 | Harris | B60P 3/127 |
| | | | | 280/438.1 |
| 7,547,179 B1 | | 6/2009 | Edmonson | |
| 7,789,411 B2 | * | 9/2010 | Schuettenberg | B60D 1/00 |
| | | | | 280/400 |
| 8,151,426 B2 | * | 4/2012 | Schneider | B60D 1/07 |
| | | | | 280/417.1 |
| 8,267,419 B2 | * | 9/2012 | Schuettenberg | B60D 1/00 |
| | | | | 280/402 |
| 8,353,521 B1 | * | 1/2013 | Seeley | B60D 1/665 |
| | | | | 280/417.1 |
| 8,622,413 B2 | * | 1/2014 | Schuettenberg | B60D 1/145 |
| | | | | 280/476.1 |
| 9,114,677 B2 | * | 8/2015 | Schuettenberg | B60D 1/015 |
| 9,381,958 B2 | * | 7/2016 | Schuettenberg | B60D 1/486 |
| 9,637,039 B1 | * | 5/2017 | Vildosola | B60P 3/125 |
| 2004/0075242 A1 | * | 4/2004 | Richards | B60D 1/155 |
| | | | | 280/478.1 |
| 2006/0072999 A1 | * | 4/2006 | Manley, Sr. | B60P 3/125 |
| | | | | 414/563 |
| 2007/0020073 A1 | | 1/2007 | Chaddock | |
| 2007/0098536 A1 | * | 5/2007 | Kooima | B60P 3/125 |
| | | | | 414/563 |
| 2010/0084837 A1 | * | 4/2010 | Quiring | B60D 1/06 |
| | | | | 280/491.5 |

\* cited by examiner

FORWARD FACING VEHICLE TRANSPORT APPARATUS

FIELD OF THE INVENTION

The claimed invention relates to the field of vehicle transport equipment; more particularly, but not by way of limitation, to a forward facing vehicle transport apparatus for transporting long haul semi tractors.

SUMMARY OF THE INVENTION

In accordance with an exemplary embodiments, a forward facing vehicle transport apparatus ("FFVTA") is provided. The exemplary embodiment of the FFVTA includes at least a main support member supported by an axle, and the axle in turn is supported by a wheel. The FFVTA further provides a toe tongue that is secured to the main support member and extends in a first direction from the main support. The toe tongue provides a telescopic extension member communicating with an extension mechanism, the telescopic extension member is configured to interact with a steer axle of a first vehicle, the steer axle supported by a tire of the first vehicle. The FFVTA further includes a pull tongue secured to the main support member and extending in a second direction from then main support. The pull tongue provides a sliding extension member that communicates with an expansion mechanism. The sliding extension member is configured to interact with a fifth wheel of a second vehicle.

The exemplary embodiment of the FFVTA further includes at least an axle cradle support member secured to the toe tongue, and an axle cradle supported by the axle cradle support member, the axle cradle in contact adjacency with and supporting the steer axle of the first vehicle. Additionally, the exemplary embodiment of the FFVTA includes at least an axle caddy supported by the toe tongue and a control box supported by the main support member. The control box shelters system controls for operation of each the extension mechanism and the expansion mechanism, while the axle caddy is configured to carry a drive axle of the first vehicle.

BRIEF DESCRIPTION OF THE DRAWINGS

FIG. 6A illustrates an alternate embodiment of an axle cradle of FIG. 6.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
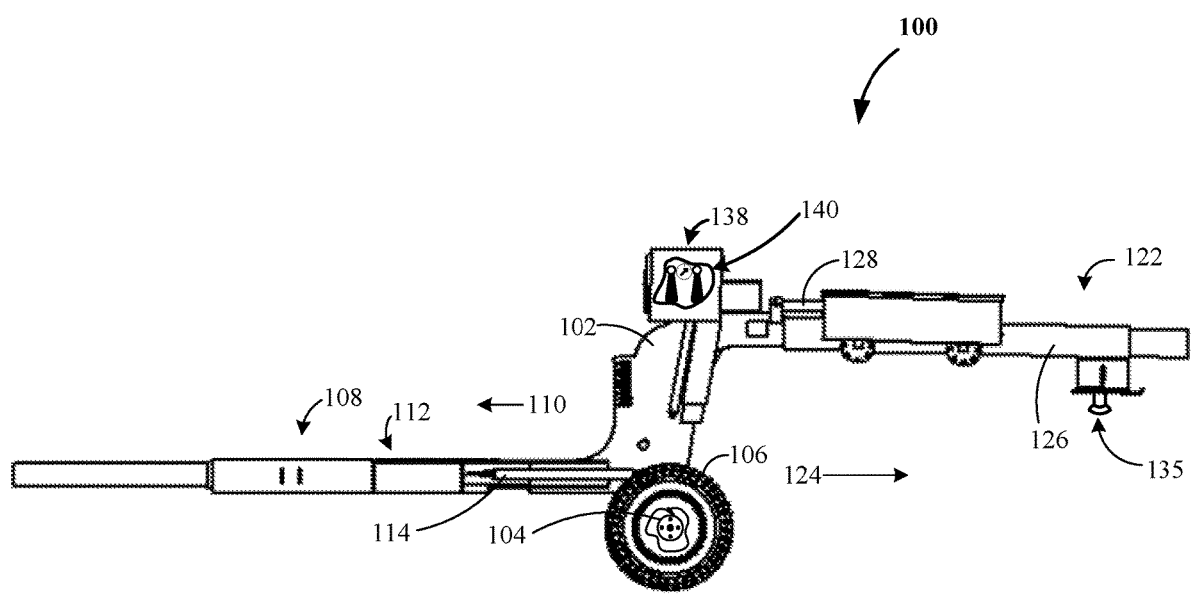
FIG. 1 is a side elevational view of an inventive forward facing vehicle transport apparatus ("FFVTA") of the present invention.

Referring to the drawings, FIG. 1, presents a side view in elevation of an inventive forward facing vehicle transport apparatus ("FFVTA") 100. In a preferred embodiment, the FFVTA 100, includes a main support member 102, supported by an axle 104, which in turn is supported by a wheel 106. The preferred embodiment further includes a toe tongue 108, secured to the main support member 102, which extends in a first direction 110, from the main support 102. The toe tongue 108, provides a telescopic extension member 112, which is operative by way of an extension mechanism 114. The telescopic extension member 112, is configured to interact with a steer axle 116 (of FIG. 5), of a first vehicle 118 (of FIG. 7). The steer axle 116, is supported by a tire 120 (of FIG. 5), of the first vehicle 118.

Returning to FIG. 1. In the preferred embodiment, the FFVTA 100, further includes a pull tongue 122, secured to the main support member 102, and extending in a second direction 124, from then main support member 102. The pull tongue 122 provides a sliding extension member 126, which is operatively coupled with an expansion mechanism 128. The sliding extension member 126 is configured to interact with a fifth wheel 130 (of FIG. 7), of a second vehicle 132 (of FIG. 7). The pull tongue 122, provides a king pin 135 (of FIG. 1) that directly engages the fifth wheel 130, of the second vehicle 132.

Figure 2:
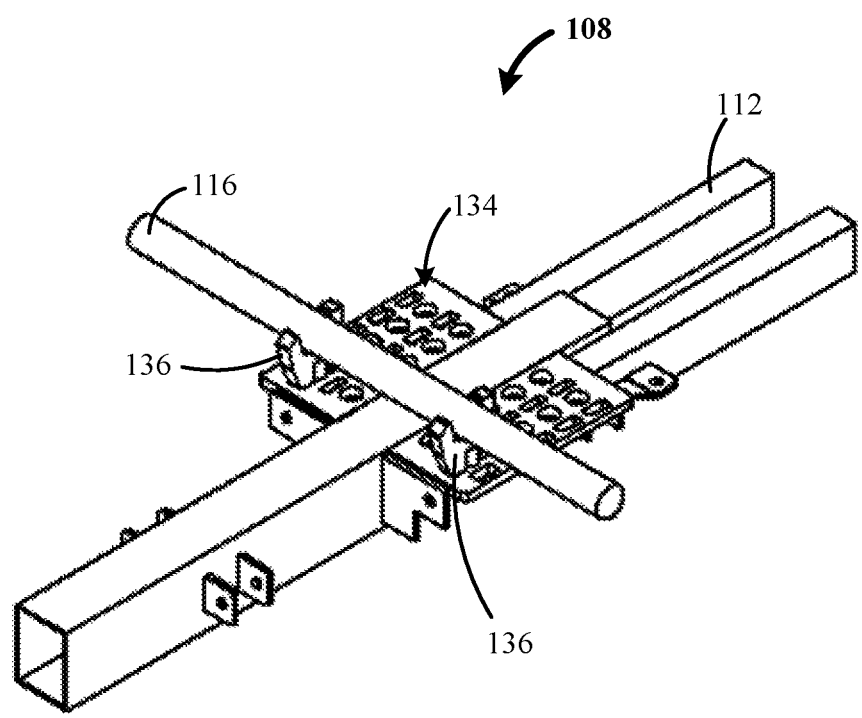
FIG. 2 is a perspective view of the FFVTA of FIG. 1.

FIG. 2, shows the toe tongue 108, supports an axle cradle support member 134, which in turn supports an axle cradle 136. The axle cradle support member 134 is secured to the telescopic extension member 112. In the preferred embodiment, the axle cradle 136, is in sliding contact adjacency with and is supporting the steer axle 116, of the first vehicle 118 (of FIG. 5).

Returning to FIG. 1. The FFVTA 100, further includes a control box 138, supported by the main support member 102. The control box 138, shelters system controls 140, for use in controlling operation of each the extension mechanism 114, and the expansion mechanism 128.

Figure 3:
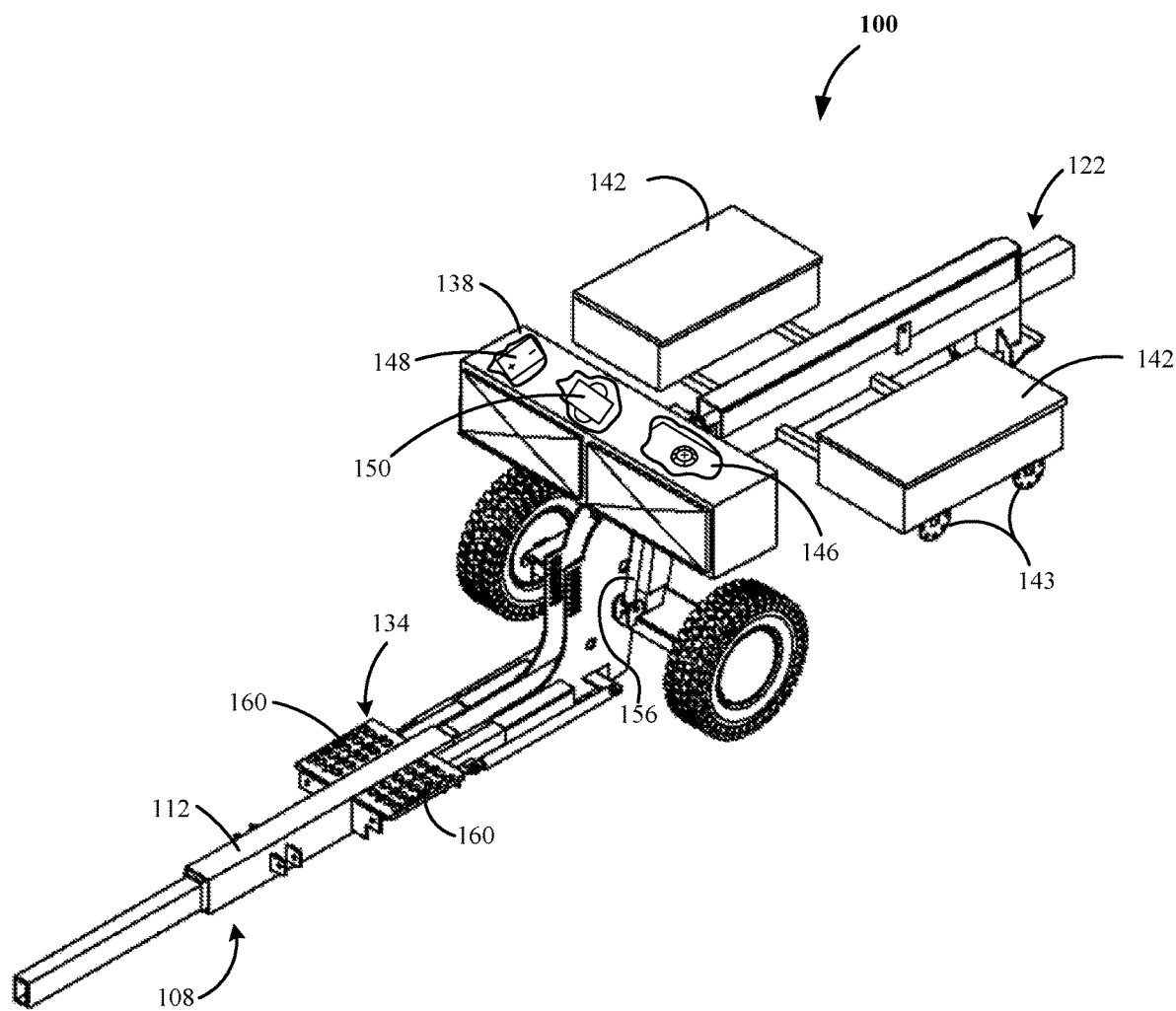
FIG. 3 is a front perspective view of the FFVTA of FIG. 1.

FIG. 3, shows the FFVTA 100, further includes a combination tool box and debris shield 142, supporting an axle caddy 143, and supported by the pull tongue 122. The combination tool box and debris shield 142, mitigates debris escaping from a tire 144 (of FIG. 7), of the second vehicle 132, impacting the first vehicle 118 (each of FIG. 7). The axle caddy 143, provides storage of drive axles 145 (of FIG. 5), during transport of the first vehicle 118 (of FIG. 5).

FIG. 3, further shows a hydraulic fluid reservoir 146, confined within the control box 138, and a power source 148, disposed within the control box 138. Interposed between hydraulic fluid reservoir 146, and the power source 148, is a hydraulic pump 150. The hydraulic pump 150, is responsive to the system controls 140 (of FIG. 1), during a vehicle load operation of the FFVTA 100.

Figure 4:
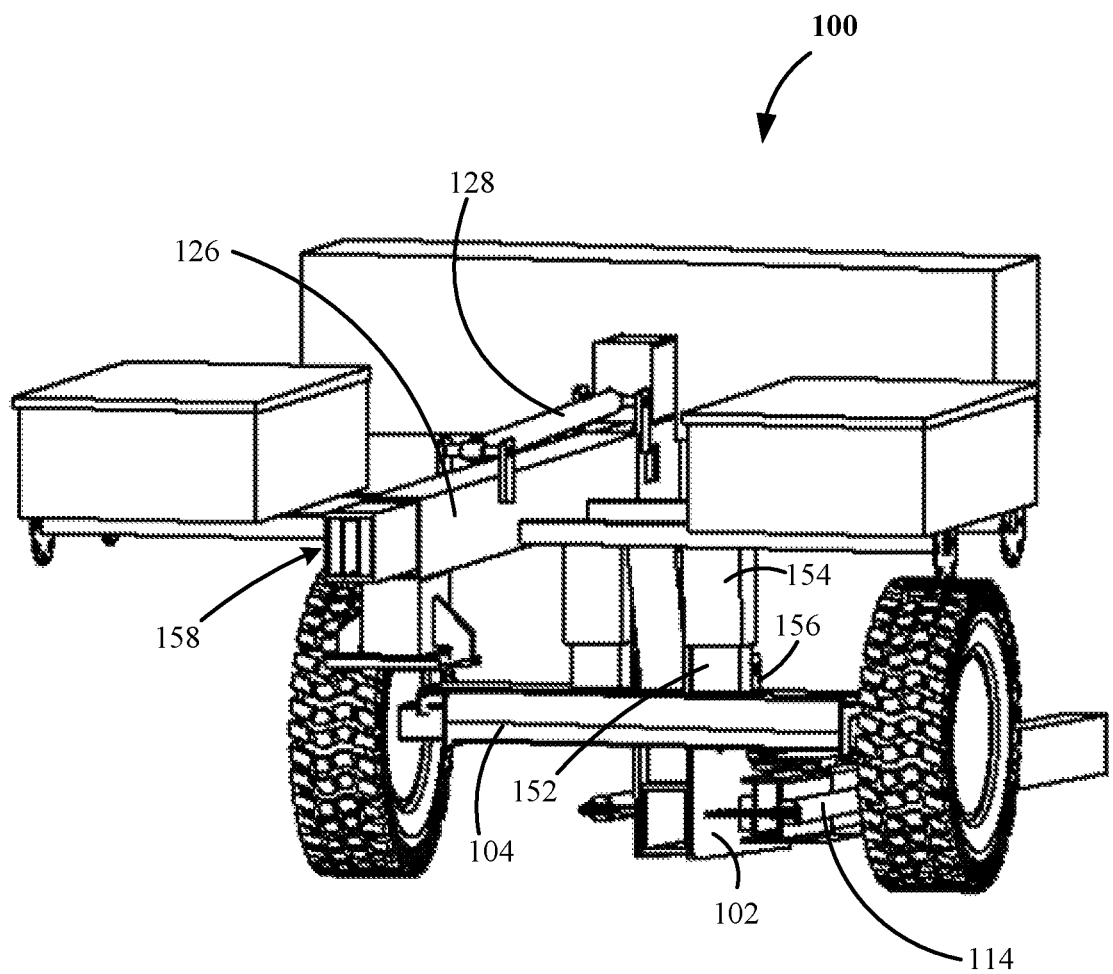
FIG. 4 is a perspective view of the FFVTA, illustrating an axle cradle, of FIG. 3, supporting a pair if axle cradles, which are engaging a steer axle of a vehicle.
Figure 7:
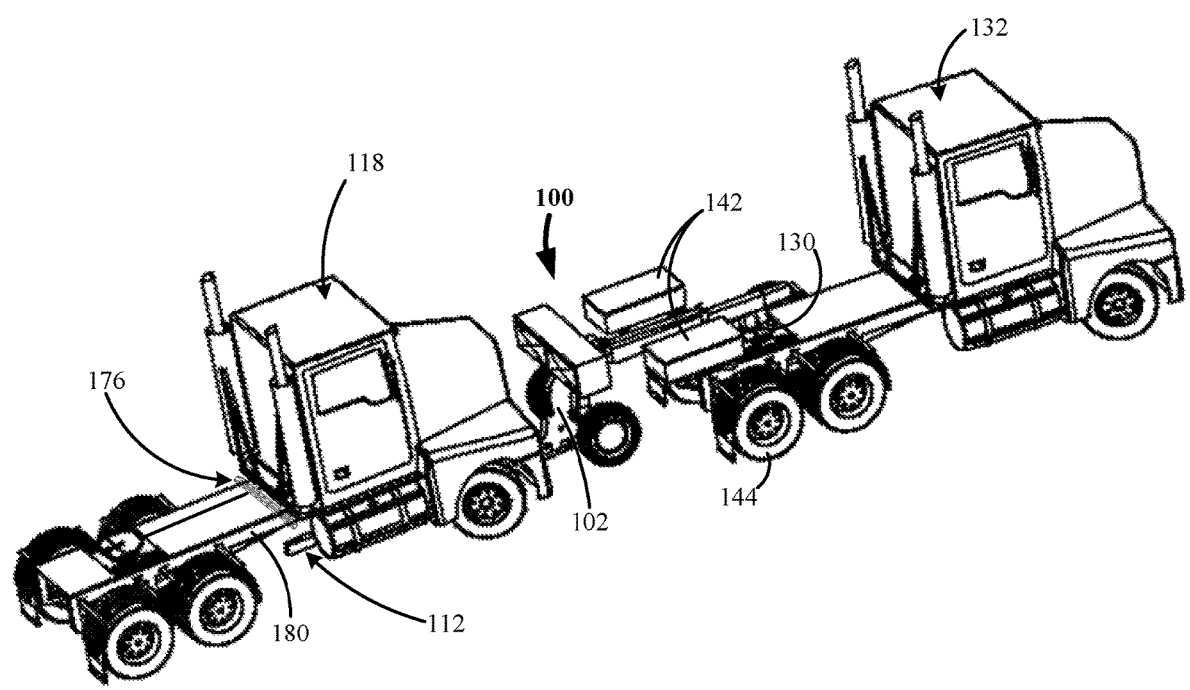
FIG. 7 is a perspective view of a pair of semi-tractors secured to the FFVTA, and a transport yoke supported by the rear semi-tractor of the pair of semi-tractors.

FIG. 4, reveals in a preferred embodiment, the FFVTA 100, further includes a guide post 152, attached to the axle 104, and a vertical slide member 154, attached to the main support member 102. The vertical slide member 154 is in sliding contact with the guide post 152, and responsive to a vertical position control apparatus 156 (also of FIG. 3), interposed between the vertical slide member 154, and the axle 104, the vertical position control apparatus 154, is responsive to the system controls 140, (of FIG. 1). The system controls 140, control the vertical position of the main support member 102, relative to the axle 104. In the preferred embodiment, the system controls 140, are interposed between the hydraulic fluid reservoir 146 (of FIG. 3), and each the extension mechanism 114, the expansion mechanism 128, and the vertical position control apparatus 156. Preferably, each the extension mechanism 114, the expansion mechanism 128, and the vertical position control apparatus 156, are correspondingly a first, second, and third hydraulic cylinders. FIG. 4 further reveals that the sliding extension member 126, houses a plurality of reinforcement members 158. The reinforcement members 158, provide additional support to the steer axle 116 (of FIG. 5), of the first vehicle 118 (of FIG. 5), when the tire 120 (of FIG. 5) of the first vehicle 118, is elevated above ground level, as shown by FIG. 7.

Returning to FIG. 3. As shown therein, the axle cradle support member 134, provides a plurality of pairs of axle cradle receptacle apertures 160, each axle cradle receptacle aperture of each pair of axle cradle receptacle apertures 160, accommodate the axle cradle 136, (of FIG. 2), the plurality of pairs of axle cradle receptacle apertures 160, accommodate a position of the steer axle 116 (of FIG. 5), of the first vehicle 118 (of FIG. 5), relative to a front bumper 162, of first vehicle 118, for a verity of different makes of the first vehicles 118.

Figure 6:
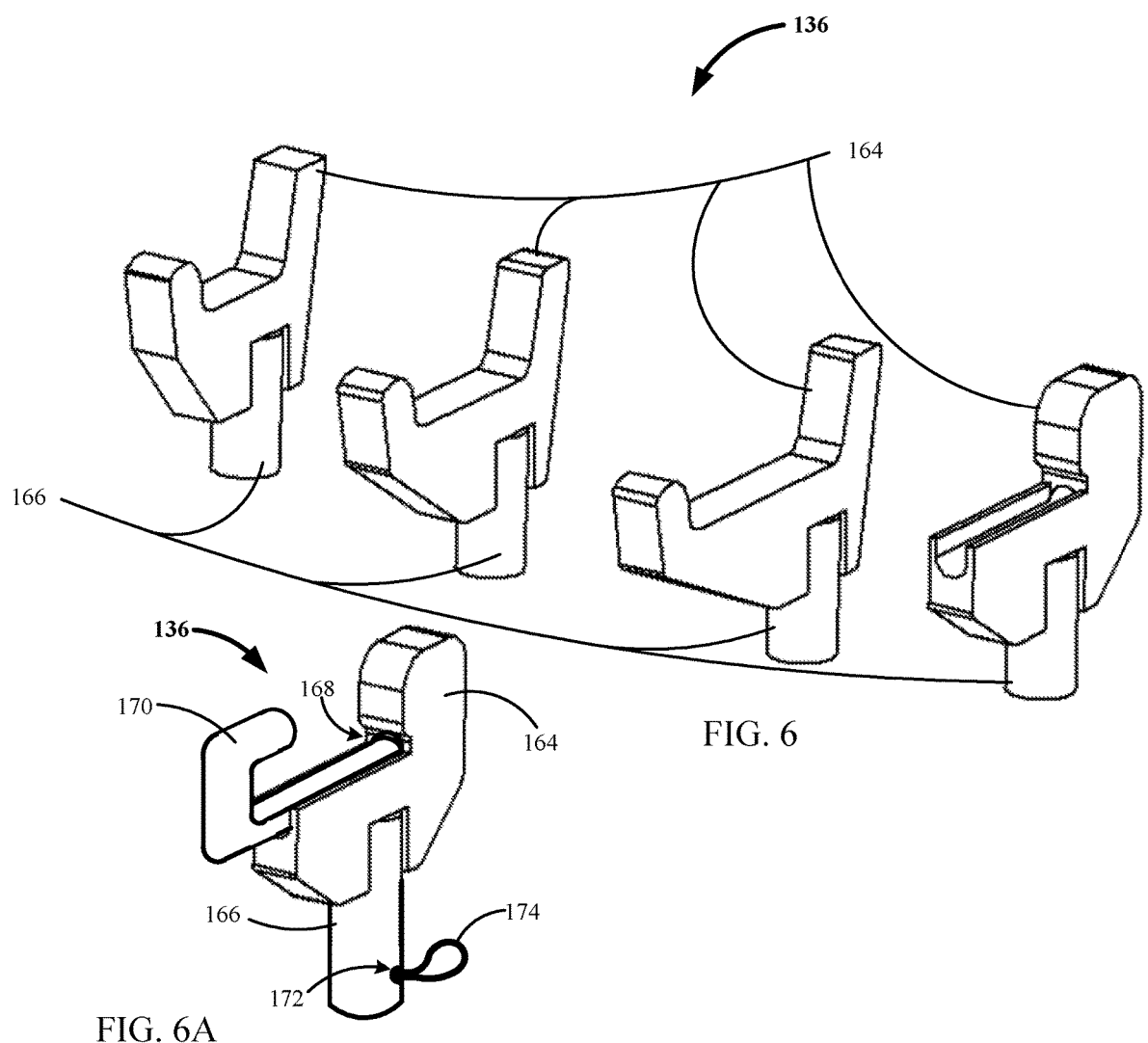
FIG. 6 illustrates a plurality of axle cradles, each of configured for adaptation to different brands of semi-tractors.

FIGS. 6 and 6A, depict the axle cradle 136, shows a plurality of embodiments for the axle cradle 136. However, each embodiment presents the same basic structural components that include: a cradle main body 164, the main body adapts to a contour of the steer axles of a plurality of truck brands; an engagement extension 166, protruding from the cradle main body 164, the engagement extension 166, is in sliding communication with a corresponding axle cradle receptacle aperture 160, (of FIG. 3).

Figure 5:
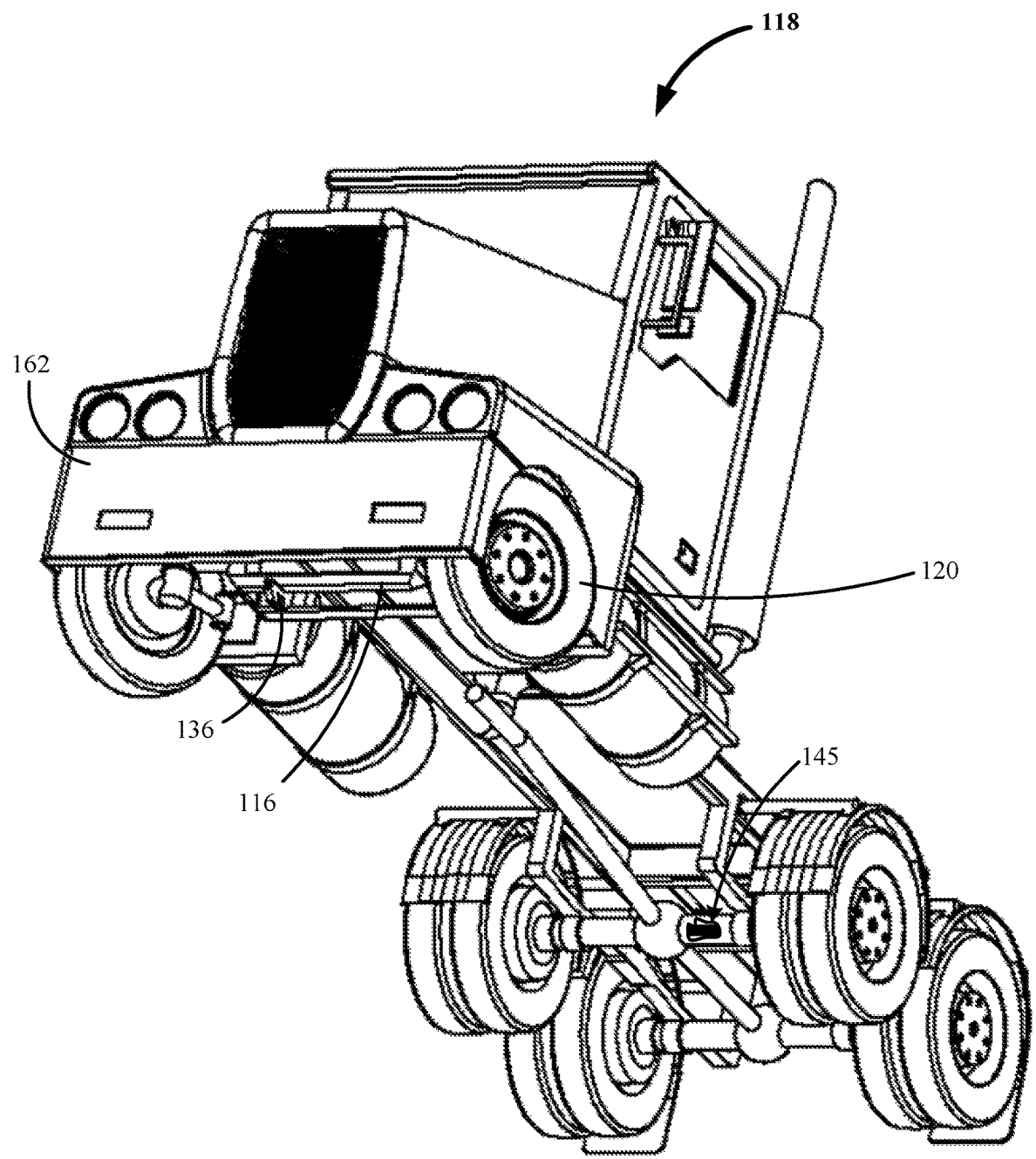
FIG. 5 is a perspective view of a truck illustrating an axle cradle interacting with the steer axle of the truck and a drive axle of the truck.

With regard to FIG. 6A, the embodiment shown therein further includes a fastening mechanism aperture 168, provided by the cradle main body 164, and a fastening mechanism 170, cooperating with the fastening mechanism aperture 168. The fastening mechanism 170, in cooperation with the fastening mechanism aperture 168, secures the axle cradle 136, to the steer axle 116, of the first vehicle 118, as shown by FIG. 5. In a preferred embodiment, the fastening mechanism 170, is in a form of a j-bolt cooperating with an associated j-bolt fastener.

The axle cradle 136, shown by FIG. 6A, further discloses a retention mechanism aperture 172, provided by the engagement extension 166. A retention mechanism 174, in cooperation with the retention mechanism aperture 172, secures the axle cradle 136, to the axle cradle support member 160 (of FIG. 3).

As shown by FIG. 7, FFVTA 100, further includes a transport yoke 176, which is supported by a frame 178, of the first vehicle 118. The transport yoke 176, communicates with the telescopic extension member 112, of the pull tongue 108 (of FIG. 3). The transport yoke 176, secures the telescopic extension member 112, of the pull tongue 108, adjacent the frame 178, of the first vehicle 118.

Figure 8:
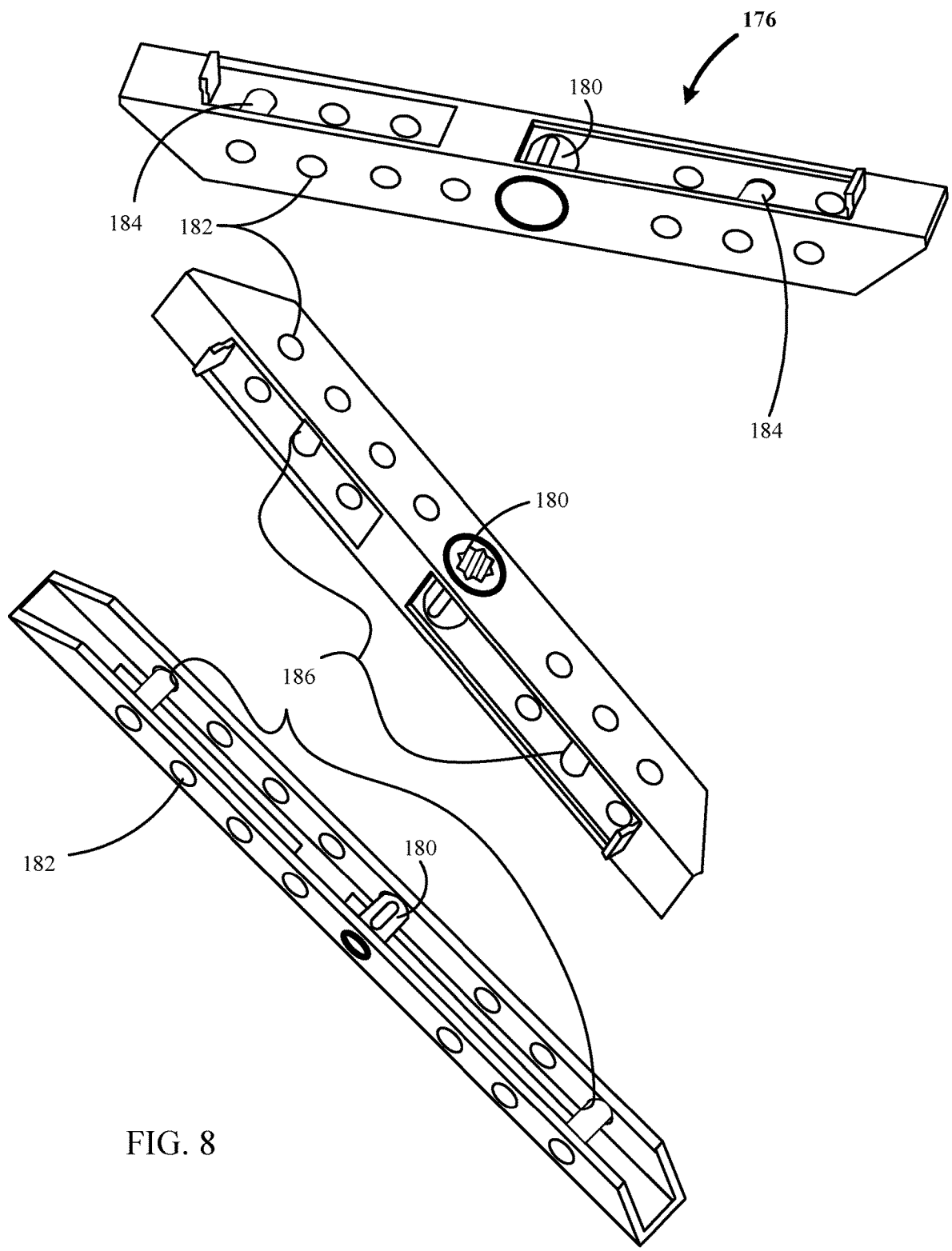
FIG. 8 is shows the transport yoke of FIG. 7, illustrated in a plurality of perspective views.

FIG. 8, shows the transport yoke 176, illustrated in a plurality of perspective views. The transport yoke 176, preferably provides a strap engagement member 180, a plurality of chain retention member apertures 182, and a chain retention member 184. The chain retention member 184, interacting with a selected pair of chain retention member apertures 186, of the plurality of chain retention member apertures 182.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Further, it will be clear that the present invention is well adapted to attain the ends and advantages mentioned as well as those inherent therein. While presently exemplary embodiments have been described for purposes of this disclosure, numerous changes may be made which will readily suggest themselves to those skilled in the art and which are encompassed by the appended claims.

What is claimed is:

1. A forward facing vehicle transport apparatus comprising:
   a main support member supported by an axle, the axle supported by a wheel;
   a toe tongue secured to the main support member and extending in a first direction from the main support, the toe tongue provides a telescopic extension member communicating with an extension mechanism, the telescopic extension member configured to interact with a steer axle of a first vehicle, the steer axle supported by a tire of the first vehicle;
   a pull tongue secured to the main support member and extending in a second direction from then main support member, the pull tongue provides a sliding extension member communicating with an expansion mechanism, the sliding extension member configured to interact with a fifth wheel of a second vehicle;
   an axle cradle support member secured to the toe tongue;
   an axle cradle supported by the axle cradle support member, the axle cradle in contact adjacency with and supporting the steer axle of the first vehicle;
   an axle caddy supported by the toe tongue, the axle caddy configured to carry a drive axle of the first vehicle; and
   a control box supported by the main support member, the control box shelters system controls for operation of each the extension mechanism and the expansion mechanism.

2. The forward facing vehicle transport apparatus of claim 1, further comprising:
   a combination tool box and debris shield supported by the pull tongue, the combination tool box and debris shield mitigates debris escaping from a tire of the second vehicle impacting the first vehicle; and
   in which the sliding extension member houses a plurality of reinforcement members, the reinforcement members provide additional support to the steer axle of the first vehicle, when the tire of the first vehicle tire is elevated above ground level.

3. The forward facing vehicle transport apparatus of claim 2, further comprising:
   a guide post attached to the axle;
   a vertical slide member attached to the main support member, the vertical slide member in sliding contact with the guide post; and
   a vertical position control apparatus interposed between the vertical slide member and the axle, the vertical position control apparatus responsive to the system controls, the system controls controlling the vertical position of the main support member relative to the axle.

4. The forward facing vehicle transport apparatus of claim 3, in which the axle cradle support member provides a plurality of pairs of axle cradle receptacle apertures, each axle cradle receptacle aperture of each pair of axle cradle receptacle apertures accommodate the axle cradle, the plurality of pairs of axle cradle receptacle apertures accommodate a position of the steer axle of the first vehicle relative to a front bumper of first vehicle.

5. The forward facing vehicle transport apparatus of claim 4, in which the vertical position control apparatus comprises a first hydraulic cylinder, the extension mechanism comprises a second hydraulic cylinder, and the expansion mechanism comprises a third hydraulic cylinder.

6. The forward facing vehicle transport apparatus of claim 5, further comprising:
 a hydraulic fluid reservoir confined within the control box; and
 the system controls interposed between the hydraulic fluid reservoir and each the first, second, and third hydraulic cylinders.

7. The forward facing vehicle transport apparatus of claim 6, further comprising:
 a power source disposed within the control box; and
 a hydraulic pump interposed between each the power source and the hydraulic fluid reservoir.

8. The forward facing vehicle transport apparatus of claim 7, further comprising a transport yoke supported by a frame of the first vehicle, the transport yoke communicates with the telescopic extension member of the toe tongue, the transport yoke secures the telescopic extension member of the toe tongue adjacent the frame of the first vehicle.

9. The forward facing vehicle transport apparatus of claim 8, in which transport yoke comprises:
 a strap engagement member;
 a plurality of chain retention member apertures, and
 a chain retention member interacting with a selected pair of chain retention member apertures of the plurality of chain retention member apertures.

10. The forward facing vehicle transport apparatus of claim 9, in which the axle cradle comprises:
 a cradle main body, the cradle main body adapts to a contour of the steer axle of the first truck; and
 an engagement extension protruding from the cradle main body, the engagement extension is in sliding communication with a corresponding axle cradle receptacle aperture.

11. The forward facing vehicle transport apparatus of claim 10, in which the axle cradle further comprising:
 a fastening mechanism aperture provided by the cradle main body; and
 a fastening mechanism cooperating with the fastening mechanism aperture, the fastening mechanism in cooperation with the fastening mechanism aperture secures the axle cradle to the steer axle of the first vehicle.

12. The forward facing vehicle transport apparatus of claim 11, in which the fastening mechanism is in a form of a j-bolt cooperating with an associated j-bolt fastener.

13. The forward facing vehicle transport apparatus of claim 12, in which the axle cradle further comprising;
 a retention mechanism aperture; and
 a retention mechanism, the retention mechanism in cooperation with the retention mechanism aperture secures the axle cradle to the axle cradle support member.

14. The forward facing vehicle transport apparatus of claim 13, in which in which the first vehicle is a first truck.

15. The forward facing vehicle transport apparatus of claim 14, in which the first truck is a first semi-tractor.

16. The forward facing vehicle transport apparatus of claim 15, in which the second vehicle is a second truck.

17. The forward facing vehicle transport apparatus of claim 16, in which the second truck is a second semi-tractor.

* * * * *